(12) United States Patent
Mori et al.

(10) Patent No.: US 10,723,266 B2
(45) Date of Patent: Jul. 28, 2020

(54) ON-VEHICLE DISPLAY CONTROLLER, ON-VEHICLE DISPLAY SYSTEM, ON-VEHICLE DISPLAY CONTROL METHOD, AND NON-TRANSITORY STORAGE MEDIUM

(71) Applicant: JVC KENWOOD Corporation, Yokohama-shi, Kanagawa (JP)

(72) Inventors: Toshio Mori, Yokohama (JP); Takuji Teruuchi, Yokohama (JP); Manabu Asayama, Yokohama (JP); Tsuneo Satomi, Yokohama (JP); Akinori Sugata, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/208,653

(22) Filed: Dec. 4, 2018

(65) Prior Publication Data
US 2019/0100143 A1   Apr. 4, 2019

Related U.S. Application Data

(63) Continuation of application No. PCT/JP2017/039422, filed on Oct. 31, 2017.

(30) Foreign Application Priority Data

Feb. 28, 2017 (JP) ................. 2017-036659

(51) Int. Cl.
*H04N 5/232* (2006.01)
*B60R 1/00* (2006.01)
(Continued)

(52) U.S. Cl.
CPC ........... *B60R 1/00* (2013.01); *H04N 5/23238* (2013.01); *H04N 5/247* (2013.01); *H04N 7/181* (2013.01);
(Continued)

(58) Field of Classification Search
CPC ................. B60R 1/00; B60R 2300/70; B60R 2300/8046; B60R 2300/102;
(Continued)

(56) References Cited

U.S. PATENT DOCUMENTS 9,308,863 B2 * 4/2016 Miyoshi ................ G06F 3/0412
9,987,983 B2 * 6/2018 Lewis ....................... G06T 7/13
(Continued)

FOREIGN PATENT DOCUMENTS

| CN | 105730337 | 7/2016 |
| DE | 102011083184 | 3/2012 |

(Continued)

OTHER PUBLICATIONS

Extended European Search Report for European Patent Application No. 17898899.4 dated May 15, 2019.
(Continued)

*Primary Examiner* — Susan E. Hodges
(74) *Attorney, Agent, or Firm* — Amin, Turocy & Watson, LLP

(57) ABSTRACT

An on-vehicle display control device includes a video data acquiring unit that acquires video data from multiple bird's-eye view video cameras for videos of a front, a rear, a left side, and a right side of a vehicle, and video data from rear side cameras for videos of rear left-side and rear right-side views of the vehicle; a bird's-eye view video generating unit that generates a bird's-eye view video by performing a viewpoint conversion and synthesizing processes on the videos of the bird's-eye view video cameras; a confirmation request detecting unit that detects a left-right situation confirmation request; and a display controller that displays, when the confirmation request is detected, on a display in a direction of the confirmation request, the video from the rear side camera in the confirmation request direction and the
(Continued)

video in a direction corresponding to the confirmation request direction in the bird's-eye view video.

9 Claims, 9 Drawing Sheets

(51) Int. Cl.
    *G06K 9/00*     (2006.01)
    *G06T 11/60*     (2006.01)
    *H04N 5/247*     (2006.01)
    *H04N 7/18*     (2006.01)

(52) U.S. Cl.
    CPC ... *B60R 2300/102* (2013.01); *B60R 2300/105* (2013.01); *B60R 2300/303* (2013.01); *B60R 2300/607* (2013.01); *B60R 2300/70* (2013.01); *B60R 2300/8046* (2013.01); *B60R 2300/8093* (2013.01)

(58) Field of Classification Search
    CPC ...... B60R 2300/8093; B60R 2300/303; B60R 2300/607; B60R 2300/105; H04N 5/247; H04N 7/181; H04N 5/23238
    USPC .......................................................... 348/148
    See application file for complete search history.

(56) References Cited

U.S. PATENT DOCUMENTS

| | | |
|---|---|---|
| 2005/0174429 A1 | 8/2005 | Yanai |
| 2010/0194596 A1 | 8/2010 | Wang et al. |
| 2010/0271481 A1* | 10/2010 | Hongo ............... B60R 1/00 348/148 |
| 2012/0105643 A1* | 5/2012 | Ozaki ............... B60R 1/00 348/148 |
| 2012/0320213 A1* | 12/2012 | Ikeda ............... B60R 1/00 348/148 |
| 2013/0002877 A1* | 1/2013 | Miyoshi ............ B60R 1/00 348/148 |
| 2014/0085472 A1* | 3/2014 | Lu ................... B60R 1/002 348/148 |
| 2016/0185292 A1 | 6/2016 | Asai |
| 2017/0113614 A1* | 4/2017 | Fluegel ............. H04N 7/181 |
| 2017/0228605 A1 | 8/2017 | Konishi |

FOREIGN PATENT DOCUMENTS

| | | |
|---|---|---|
| JP | 2003-219413 | 7/2003 |
| JP | 2011-030078 | 2/2011 |
| JP | 2012-066700 | 4/2012 |
| JP | 2015-032936 | 2/2015 |
| JP | 2016-088104 | 5/2016 |
| JP | 2016-168877 | 9/2016 |

OTHER PUBLICATIONS

International Search Report and Written Opinion for International Patent Application No. PCT/JP2017/039422 dated Jan. 23, 2018, 9 pages.
Chinese Office Action for Chinese Patent Application No. 201780032520.2 dated Mar. 16, 2020.

* cited by examiner

ON-VEHICLE DISPLAY CONTROLLER, ON-VEHICLE DISPLAY SYSTEM, ON-VEHICLE DISPLAY CONTROL METHOD, AND NON-TRANSITORY STORAGE MEDIUM

CROSS-REFERENCE TO RELATED APPLICATIONS

This application is a Continuation of PCT International Application No. PCT/JP2017/039422 filed in Japan on Oct. 31, 2017, which claims priority to and incorporates by references the entire contents of Japanese Patent Application No. 2017-036659 filed in Japan on Feb. 28, 2017.

FIELD

The present application relates to an on-vehicle display controller, an on-vehicle display system, an on-vehicle display control method, and a non-transitory storage medium.

BACKGROUND

A technology for capturing videos of surroundings of a vehicle with cameras that are arranged around the vehicle and displaying, on a monitor, a bird's-eye view video obtained by performing a viewpoint conversion process on the captured videos is known. In addition, a technology for displaying a bird's-eye view video and videos of side views based on a change of a shift position or a drive range is known (for example, see Japanese Laid-open Patent Publication No. 2012-066700).

For example, a driver of the vehicle may want to surely check surroundings of the vehicle in certain directions other than the frontward direction in some cases, such as when parking the vehicle or turning right or left. In this case, the driver checks rear side views by using side monitors. However, it may be difficult to recognize a depth using the side monitors, as compared to using conventional optical side mirrors.

A bird's-eye view video is useful to recognize a relative positional relationship between the vehicle and surroundings of the vehicle. Therefore, with the bird's-eye view video, it becomes possible to recognize a relative positional relationship between the vehicle and the surroundings of the vehicle in the depth direction. However, a monitor for displaying the bird's-eye view video is arranged in a central portion on a front of a vehicle room. Therefore, viewing the monitor arranged in the central portion while checking the side monitors that are arranged outside of the front of the vehicle room in the vehicle width direction cause large movement of line of sight.

SUMMARY

An on-vehicle display controller, an on-vehicle display system, an on-vehicle display control method, and a non-transitory storage medium are disclosed.

Solution to Problem

According to one aspect, there is provided an on-vehicle display control device comprising: a video data acquiring unit configured to acquire video data from a plurality of bird's-eye view video cameras that capture videos of a front, a rear, a left side, and a right side of a vehicle, and video data from rear side cameras that capture videos of a rear left-side view and a rear right-side view of the vehicle; a bird's-eye view video generating unit configured to generate a bird's-eye view video by performing a viewpoint conversion process and a synthesizing process on the videos of the bird's-eye view video cameras acquired by the video data acquiring unit; a confirmation request detecting unit configured to detect a left-right situation confirmation request for the vehicle; and a display controller configured to, when the confirmation request detecting unit detects the confirmation request, display, on a display arranged in a direction of the detected confirmation request, the video that is obtained from the rear side camera arranged in the direction of the confirmation request and the video in a direction corresponding to the direction of the confirmation request in the bird's-eye view video generated by the bird's-eye view video generating unit.

According to one aspect, there is provided an on-vehicle display control method comprising: acquiring video data from a plurality of bird's-eye view video cameras that capture videos of a front, a rear, a left side, and a right side of a vehicle, and video data from rear side cameras that capture videos of a rear left-side view and a rear right-side view of the vehicle; generating a bird's-eye view video by performing a viewpoint conversion process and a synthesizing process on the videos of the bird's-eye view video cameras acquired; detecting a left-right situation confirmation request for the vehicle as a confirmation request; and displaying, when the confirmation request is detected, displaying, on a display arranged in a direction of the detected confirmation request, a video that is obtained from the rear side camera arranged in the direction of the confirmation request and a video in a direction corresponding to the direction of the confirmation request in the bird's-eye view video generated.

According to one aspect, there is provided a non-transitory storage medium that stores a program that causes a computer that functions as an on-vehicle display control device to execute: acquiring video data from a plurality of bird's-eye view video cameras that capture videos of a front, a rear, a left side, and a right side of a vehicle, and video data from rear side cameras that capture videos of a rear left-side view and a rear right-side view of the vehicle; generating a bird's-eye view video by performing a viewpoint conversion process and a synthesizing process on the videos of the bird's-eye view video cameras acquired; detecting a left-right situation confirmation request for the vehicle as a confirmation request; and displaying, when the confirmation request is detected, displaying, on a display arranged in a direction of the detected confirmation request, a video that is obtained from the rear side camera arranged in the direction of the confirmation request and a video in a direction corresponding to the direction of the confirmation request in the bird's-eye view video generated.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Embodiments of an on-vehicle display controller 40, an on-vehicle display system 1, an on-vehicle display control method, and a program according to the present application will be described in detail below with reference to the accompanying drawings. The present application is not limited by the embodiments below.

First Embodiment

Figure 1:
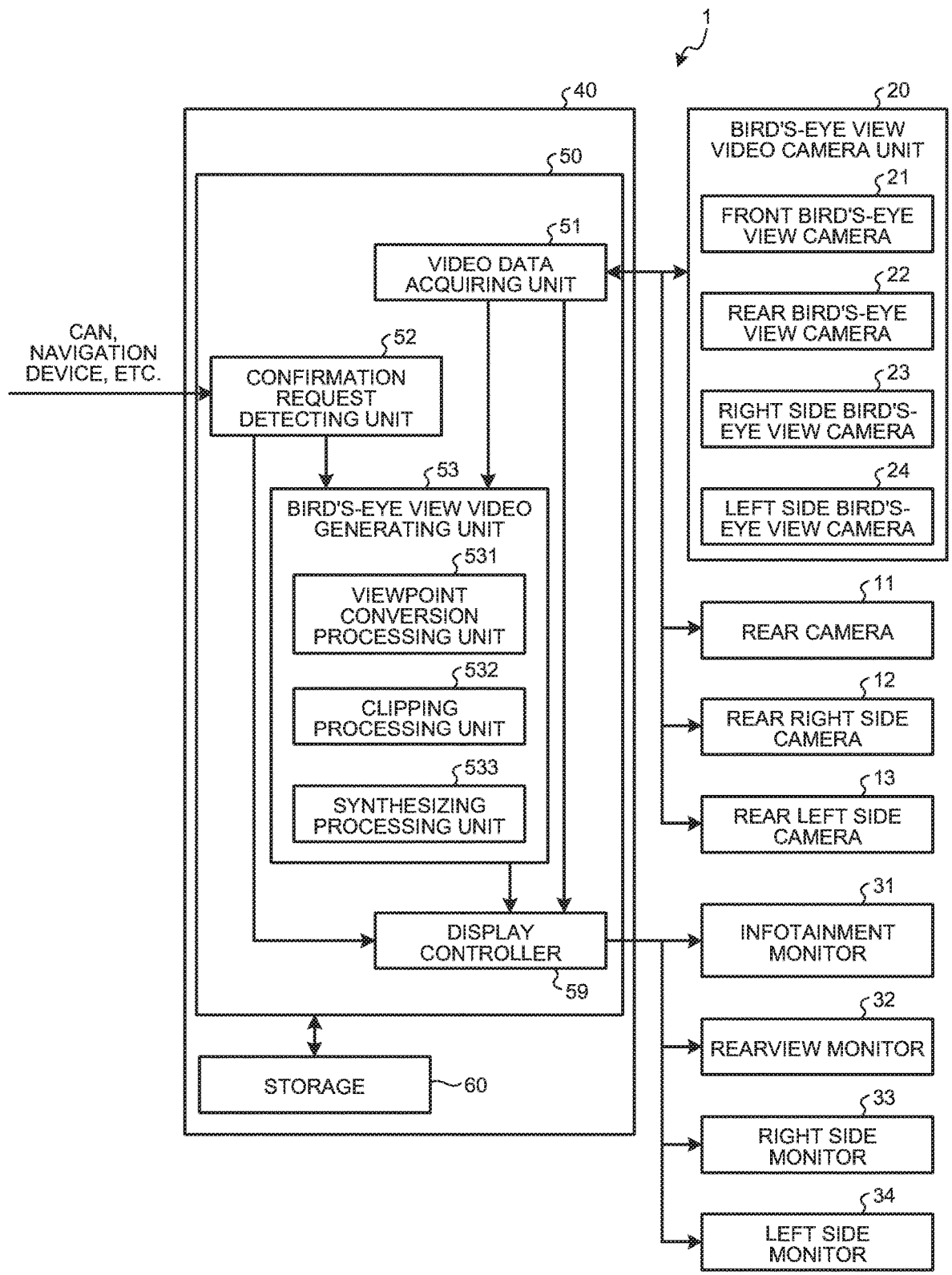
FIG. 1 is a block diagram illustrating a configuration example of an on-vehicle display system according to a first embodiment.

The on-vehicle display system 1 is mounted on a vehicle V and displays surroundings of the vehicle. FIG. 1 is a block diagram illustrating a configuration example of the on-vehicle display system according to the first embodiment.

As illustrated in FIG. 1, the on-vehicle display system 1 includes a rear camera 11, a rear right-side camera (rear side camera) 12, a rear left-side camera (rear side camera) 13, a bird's-eye view video camera unit 20, an infotainment monitor 31, a rearview monitor 32, a right-side monitor (display) 33, a left-side monitor (display) 34, and the on-vehicle display controller 40. In the following description, video data acquired from each of the cameras is data of a moving image that is constituted of consecutive videos with 30 to 60 frames per second, and a video displayed on each of the monitors is a video that is based on the moving image.

Figure 2:
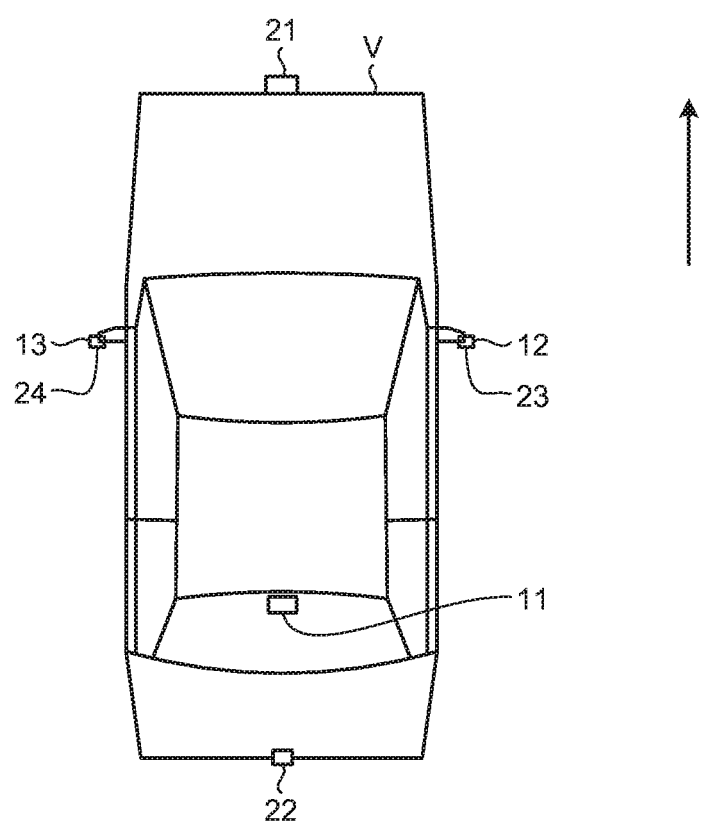
FIG. 2 is a schematic diagram illustrating a configuration example of rear side cameras and bird's-eye view video cameras of the on-vehicle display system according to the first embodiment.

As illustrated in FIG. 2, the rear camera 11 is arranged on a rear of the vehicle V and captures a video of rear view of the vehicle V. FIG. 2 is a schematic diagram illustrating a configuration example of the rear side cameras and a bird's-eye view video camera of the on-vehicle display system according to the first embodiment. The rear camera 11 captures a region including a region checked by the rearview monitor 32. The rear camera 11 captures a video of a region including blind spots of the rear right-side camera 12 and the rear left-side camera 13. A horizontal angle of view of the rear camera 11 is, for example, 90° to 180°, and a vertical angle of view of the rear camera 11 is, for example, 45° to 90°. The rear camera 11 outputs the captured video data to a video data acquiring unit 51 of the on-vehicle display controller 40.

Figure 3:
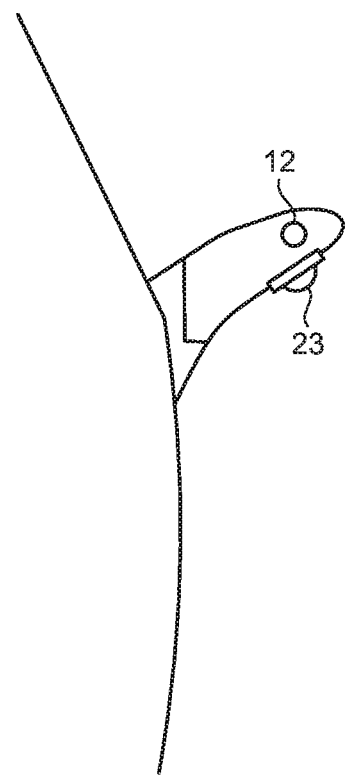
FIG. 3 is a schematic diagram illustrating a configuration example of a rear right-side camera of the on-vehicle display system according to the first embodiment.

As illustrated in FIG. 2 and FIG. 3, the rear right-side camera 12 is arranged on a right side of the vehicle V and captures a video of right side view of the vehicle V. FIG. 3 is a schematic diagram illustrating a configuration example of the rear right-side camera of the on-vehicle display system according to the first embodiment. The rear right-side camera 12 captures a region checked by the right-side monitor 33. A horizontal angle of view of the rear right-side camera 12 is, for example, 15° to 45°, and a vertical angle of view of the rear right-side camera 12 is, for example, 15° to 45°. A supporting member on which the rear right-side camera 12 is mounted is foldable toward the vehicle V. The rear right-side camera 12 outputs the captured video data to the video data acquiring unit 51 of the on-vehicle display controller 40.

Referring back to FIG. 2, the rear left-side camera 13 is arranged on a left side of the vehicle V and captures a video of left side view of the vehicle V. The rear left-side camera 13 captures a region checked by the left-side monitor 34. A horizontal angle of view of the rear left-side camera 13 is, for example, 15° to 45°, and a vertical angle of view of the rear left-side camera 13 is, for example, 15° to 45°. A supporting member on which the rear left-side camera 13 is mounted is foldable toward the vehicle V. The rear left-side camera 13 outputs the captured video data to the video data acquiring unit 51 of the on-vehicle display controller 40.

The bird's-eye view video camera unit (a plurality of bird's-eye view video cameras) 20 includes a front bird's-eye view camera 21, a rear bird's-eye view camera 22, a right side bird's-eye view camera 23, and a left side bird's-eye view camera 24.

The front bird's-eye view camera 21 is arranged on a front of the vehicle V and captures a video of surroundings around the front of the vehicle V. The front bird's-eye view camera 21 captures a video of, for example, an imaging region of approximately 180°. The front bird's-eye view camera 21 outputs the captured video to the video data acquiring unit 51 of the on-vehicle display controller 40.

The rear bird's-eye view camera 22 is arranged on a rear of the vehicle V and captures a video of surroundings around the rear of the vehicle V. The rear bird's-eye view camera 22 captures a video of, for example, an imaging region of approximately 180°. The rear bird's-eye view camera 22 outputs the captured video to the video data acquiring unit 51 of the on-vehicle display controller 40.

As illustrated in FIG. 2 and FIG. 3, the right side bird's-eye view camera 23 is arranged on the right side of the vehicle V and captures a video of surroundings around the right side of the vehicle V. The right side bird's-eye view camera 23 captures a video of, for example, an imaging region of approximately 180°. The right side bird's-eye view camera 23 outputs the captured video to the video data acquiring unit 51 of the on-vehicle display controller 40.

Referring back to FIG. 2, the left side bird's-eye view camera 24 is arranged on the left side of the vehicle V and captures a video of surroundings around the left side of the vehicle V. The left side bird's-eye view camera 24 captures a video of, for example, an imaging region of approximately 180°. The left side bird's-eye view camera 24 outputs the captured video to the video data acquiring unit 51 of the on-vehicle display controller 40.

The bird's-eye view video camera unit 20 including the front bird's-eye view camera 21, the rear bird's-eye view camera 22, the right side bird's-eye view camera 23, and the left side bird's-eye view camera 24 as described above captures videos in all directions around the vehicle V.

Figure 4:
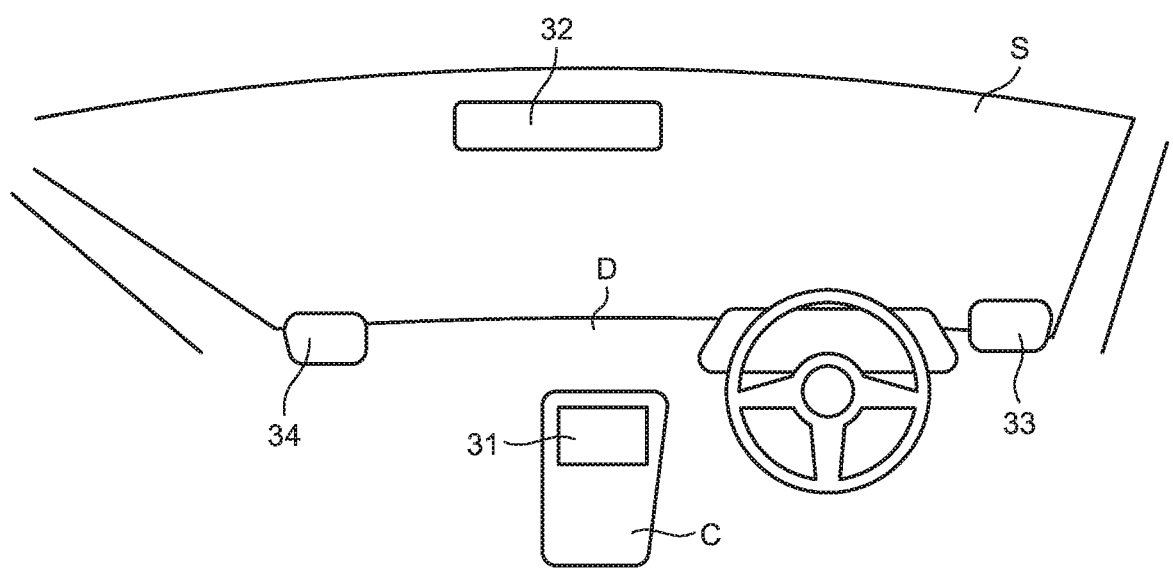
FIG. 4 is a schematic diagram illustrating a configuration example of a monitor of the on-vehicle display system according to the first embodiment.

As illustrated in FIG. 4, an infotainment monitor 31 is, for example, a display including a liquid crystal display (LCD) or an organic electro-luminescence (EL) display. FIG. 4 is a schematic diagram illustrating a configuration example of a monitor of the on-vehicle display system according to the first embodiment. The infotainment monitor 31 displays, for example, a bird's-eye view video based on a video signal that is output from the on-vehicle display controller 40 of the on-vehicle display system 1. The infotainment monitor 31 may be dedicated to the on-vehicle display system 1 or shared with other systems including a navigation system, for example. The infotainment monitor 31 is arranged at a position easily viewable by a driver of the vehicle. In the present embodiment, the infotainment monitor 31 is arranged on a center console C in a central portion of a dashboard D in a vehicle width direction.

The rearview monitor 32 is, for example, an electronic rearview mirror. When the rearview monitor 32 is used as an electronic rearview mirror, it does not matter whether a half mirror for checking the rear side by optical reflection is provided or not. The rearview monitor 32 is, for example, a display including a liquid crystal display, an organic electro-luminescence display, or the like. The rearview monitor 32 displays a video of the rear view of the vehicle V based on a video signal that is output from the on-vehicle display controller 40. The rearview monitor 32 is arranged at a position easily viewable by the driver. In the present embodiment, the rearview monitor 32 is arranged in an upper central portion of a windshield in the vehicle width direction.

The right-side monitor 33 is, for example, a display including a liquid crystal display, an organic EL display, or the like. The right-side monitor 33 displays a video of rear right-side view of the vehicle V based on a video signal that is output from a display controller 59 of the on-vehicle display controller 40. The right-side monitor 33 is arranged at a position easily viewable by the driver. In the present embodiment, the right-side monitor 33 is arranged on a right side of the dashboard D in the vehicle width direction.

The left-side monitor 34 is, for example, a display including a liquid crystal display, an organic EL display, or the like. The left-side monitor 34 displays a video of rear left-side view of the vehicle V based on a video signal that is output from the display controller 59 of the on-vehicle display controller 40. The left-side monitor 34 is arranged at a position easily viewable by the driver. In the present embodiment, the left-side monitor 34 is arranged on a left side of the dashboard D in the vehicle width direction.

Referring back to FIG. 1, the on-vehicle display controller includes a controller 50 and a storage 60.

The controller 50 is an arithmetic processing device configured with a central processing unit (CPU) or the like, for example. The controller 50 includes the video data acquiring unit 51, a confirmation request detecting unit 52, a bird's-eye view video generating unit 53, and the display controller 59. The controller 50 executes commands contained in programs stored in the storage 60.

The video data acquiring unit 51 acquires video data from the bird's-eye view video camera unit 20 that captures videos of the front, the rear, the right side, and the left side of the vehicle V, and video data from the rear side cameras that capture videos of the rear left-side and the rear right-side of the vehicle V. The video data acquiring unit 51 acquires surroundings video data from the bird's-eye view video camera unit 20. The video data acquiring unit 51 acquires video data from the rear camera 11. The video data acquiring unit 51 acquires video data from the rear right-side camera 12 and the rear left-side camera 13. The video data acquiring unit 51 outputs the pieces of acquired video data to the bird's-eye view video generating unit 53 and the display controller 59.

The confirmation request detecting unit 52 acquires, for example, operation information for a direction indicator, steering, and doors of the vehicle V, that indicates a left-right situation confirmation request (confirmation request) for the vehicle V, from a controller area network (CAN), various sensors that sense situations of the vehicle V, or the like. The confirmation request detecting unit 52 may acquire navigation information that indicates the left-right situation confirmation request for the vehicle V. The confirmation request detecting unit 52 may detect an obstacle by, for example, an infrared sensor, an ultrasonic sensor, a millimeter-wave sensor, a sensor using image recognition, or the like, and acquire obstacle information that indicates the left-right situation confirmation request for the vehicle V. When acquiring the operation information indicating the left-right situation confirmation request for the vehicle V, the confirmation request detecting unit 52 outputs, to the bird's-eye view video generating unit 53, a confirmation request direction and information indicating that the confirmation request has been detected. When not acquiring the operation information indicating the left-right situation confirmation request for the vehicle V, the confirmation request detecting unit 52 outputs, to the bird's-eye view video generating unit 53, information indicating that the confirmation request has not been detected.

The left-right situation confirmation request for the vehicle V indicates that the driver is requesting or needing to confirm situations around at least one of the right side and the left side of the vehicle V. The right side and the left side of the vehicle V, for which the driver is requesting confirmation, are referred to as the confirmation request directions.

For example, when the vehicle V moves rearward, the confirmation request detecting unit 52 detects the left-right situation confirmation request in which the confirmation request directions correspond to the right side and the left side, based on operation information indicating that a shift position is changed to "reverse".

For example, when the vehicle V switches lanes, the confirmation request detecting unit 52 detects the left-right situation confirmation request in which the confirmation request direction is a lane change direction and corresponds to the right side or the left side, based on navigation information and information on a steering angle.

For example, when operation of opening a right door or a left door of the vehicle V is performed, the confirmation request detecting unit 52 detects the left-right situation confirmation request in which the confirmation request direction is a direction in which the opening operation is performed and corresponds to the right side or the left side, based on information indicating that the right door or the left door is opened.

For example, when the direction indicator is operated, the confirmation request detecting unit 52 detects the left-right situation confirmation request in which the confirmation request direction is a direction toward which the direction indicator is operated and corresponds to the right side or the left side, based on operation information on the direction indicator.

For example, when the vehicle V moves rearward and if an obstacle is present near the vehicle on the right side, the left side, or the rear side, the confirmation request detecting unit 52 detects the left-right situation confirmation request in which the confirmation request direction is a detected direction of a sensor or a direction of a camera that has captured an image of the obstacle and corresponds to the right side or the left side, based on detection information of the sensor or obstacle information that is obtained from a result of image analysis in image processing. Meanwhile, when the obstacle is detected on the rear side, the confirmation request direction is assumed to be the right side and the left side.

The bird's-eye view video generating unit 53 performs a viewpoint conversion process, a clipping process, and a synthesizing process on surroundings videos that are acquired by the video data acquiring unit 51. The bird's-eye view video generating unit 53 generates a bird's-eye view video, in which a vehicle icon representing a size and a shape of the vehicle V is displayed in a central portion of synthesized videos.

The bird's-eye view video generating unit 53 includes a viewpoint conversion processing unit 531, a clipping processing unit 532, and a synthesizing processing unit 533.

The viewpoint conversion processing unit 531 performs the viewpoint conversion process on the surroundings video data acquired by the video data acquiring unit 51 such that the vehicle V is looked down from above. More specifically, the viewpoint conversion processing unit 531 generates a video by performing the viewpoint conversion process based on the surroundings video data captured by the bird's-eye view video camera unit 20. Any well-known method may be adopted as a method of the viewpoint conversion process and the method is not specifically limited. The viewpoint conversion processing unit 531 outputs the surroundings video data converted by the viewpoint conversion process to the clipping processing unit 532.

The clipping processing unit 532 performs the clipping process of clipping a video of a predetermined region from the surroundings video data converted by the viewpoint conversion process. A region to be adopted as the clipping region is registered and stored in advance. The clipping processing unit 532 outputs video data of the video clipped by the clipping process to the synthesizing processing unit 533.

The synthesizing processing unit 533 performs the synthesizing process of synthesizing video data clipped by the clipping process. The synthesizing processing unit 533 generates a bird's-eye view video, in which the vehicle icon is displayed in the synthesized videos.

The display controller 59 displays the bird's-eye view video generated by the bird's-eye view video generating unit 53 on the infotainment monitor 31. The display controller 59 displays a video, which is captured by the rear camera 11 and acquired by the video data acquiring unit 51, on the rearview monitor 32. The display controller 59 displays a video, which is captured by the rear right-side camera 12 and acquired by the video data acquiring unit 51, on the right-side monitor 33. The display controller 59 displays a video, which is captured by the rear left-side camera 13 and acquired by the video data acquiring unit 51, on the left-side monitor 34.

When the confirmation request detecting unit 52 detects a confirmation request, the display controller 59 displays, on the right-side monitor 33 or the left-side monitor 34, that is arranged in the detected confirmation request direction (hereinafter, referred to as a "side monitor of the confirmation request direction"), a rear side video 100 (see FIG. 5) that is captured by the rear side camera, that is, the rear right-side camera 12 or the rear left-side camera 13 arranged in the confirmation request direction, and a bird's-eye view video 110 (see FIG. 5) in a direction corresponding to the confirmation request direction in the bird's-eye view video generated by the bird's-eye view video generating unit 53.

The direction corresponding to the confirmation request direction is the same direction as the confirmation request direction or a direction opposite to the confirmation request direction. In the present embodiment, it is assumed that the direction corresponding to the confirmation request direction is the same direction as the confirmation request direction.

The display controller 59 generates the bird's-eye view video 110 by clipping a region in the direction corresponding to the confirmation request direction in the bird's-eye view video generated by the bird's-eye view video generating unit 53.

The display controller 59 displays the rear side video 100 on an inner side of the side monitor of the confirmation request direction in the vehicle width direction, and displays the bird's-eye view video 110 on the outer side in the vehicle width direction. Alternatively, the display controller 59 may display the rear side video 100 on the outer side of the side monitor of the confirmation request direction in the vehicle width direction, and may display the bird's-eye view video 110 on the inner side in the vehicle width direction.

For example, when the confirmation request detecting unit 52 detects a confirmation request in which the confirmation request direction corresponds to the right side (hereinafter, referred to as a "right confirmation request"), the display controller 59 displays, on the left side of the right-side monitor 33, the rear side video 100 that is obtained by capturing a video of the rear right view with the rear right-side camera 12, and displays, on the right side of the right-side monitor 33, the bird's-eye view video 110 that is obtained by clipping a region in a rightward direction in the bird's-eye view video generated by the bird's-eye view video generating unit 53 as a video in the direction corresponding to the confirmation request direction.

For example, when the confirmation request detecting unit 52 detects a confirmation request in which the confirmation request direction corresponds to the left side (hereinafter, referred to as a "left confirmation request"), the display controller 59 displays, on the right side of the left-side monitor 34, the rear side video 100 that is obtained by capturing a video of the rear left view with the rear left-side camera 13, and displays, on the left side of the left-side monitor 34, the bird's-eye view video 110 that is obtained by clipping a region in a leftward direction in the bird's-eye view video generated by the bird's-eye view video generating unit 53 as a video in the direction corresponding to the confirmation request direction.

For example, when the confirmation request detecting unit 52 detects a situation confirmation request in which the confirmation request direction corresponds to the right side and the left side, the display controller 59 performs the same processes as the processes that are performed when the right confirmation request is detected and the same processes as the processes that are performed when the left confirmation request is detected as described above.

Figure 5:
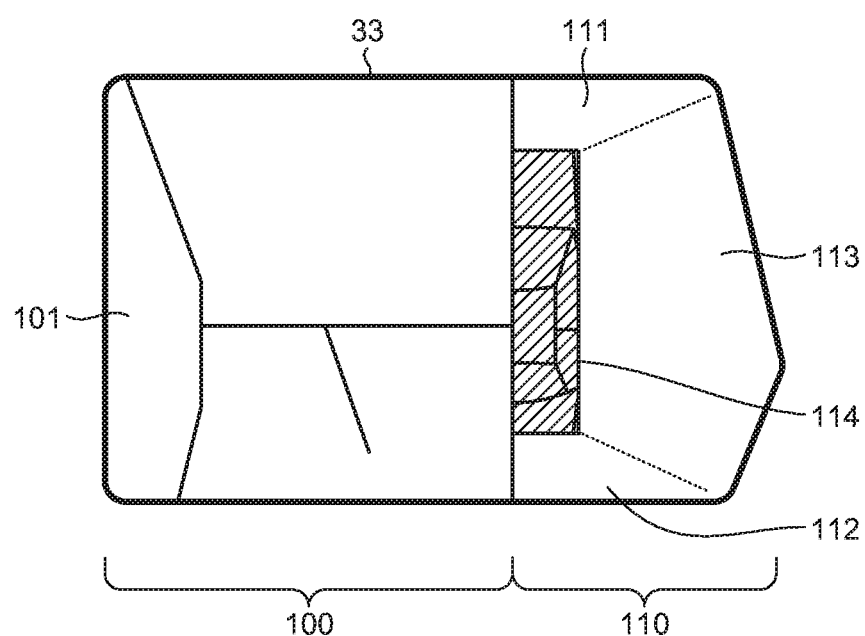
FIG. 5 is a diagram illustrating an example of videos that are displayed on a rear right-side monitor by the on-vehicle display system according to the first embodiment.

The videos that are displayed on the right-side monitor 33 when the confirmation request detecting unit 52 detects the right confirmation request will be described with reference to FIG. 5. FIG. 5 is a diagram illustrating an example of the videos that are displayed on the right-side monitor by the on-vehicle display system according to the first embodiment. On the right-side monitor 33, the rear side video 100 of the right side and the bird's-eye view video 110 are displayed side by side in the vehicle width direction.

The rear side video 100 of the rear right-side view is a video that is obtained by imaging the rear right-side view of the vehicle V with the rear right-side camera 12. The rear side video 100 of the rear right-side view contains the same region as a conventional optical right-side mirror. The rear side video 100 of the rear right-side view contains a region in which a right side body 101 of the vehicle V appears. In the present embodiment, the rear side video 100 of the rear right-side view is displayed on the vehicle V side.

The bird's-eye view video 110 is a video that is obtained by clipping a video on the right side in the bird's-eye view video generated by the bird's-eye view video generating unit 53. In the present embodiment, the bird's-eye view video 110 is a video that is obtained by clipping a right half region of the bird's-eye view video generated by the bird's-eye view video generating unit 53. The bird's-eye view video 110 contains a front video 111, a rear video 112, and a right side video 113. In the present embodiment, the front video 111 and the rear video 112 contain corresponding regions up to the central portion of a vehicle icon 114 in the vehicle width direction. The vehicle icon 114 is displayed on the left side in the bird's-eye view video 110. The vehicle icon 114 represents the shape and the size of the right half of the vehicle. The bird's-eye view video 110 is displayed on the outside of the rear side video 100 of the right side in the vehicle width direction.

In FIG. 5, inclined dashed lines indicating borders between the front video 111, the rear video 112, and the right side video 113 are illustrated for convenience of explanation. However, it does not matter whether or not the dashed lines are displayed in the bird's-eye view video 110 that is actually displayed on the right-side monitor 33. The same applies to the other drawings.

The storage 60 stores therein data needed for various processes performed by the on-vehicle display controller 40 and various processing results. The storage 60 is a semiconductor memory device, such as a random access memory (RAM), a read only memory (ROM), or a flash memory, or a storage device, such as a hard disk, an optical disk, or an external storage device over a network, for example.

Figure 6:
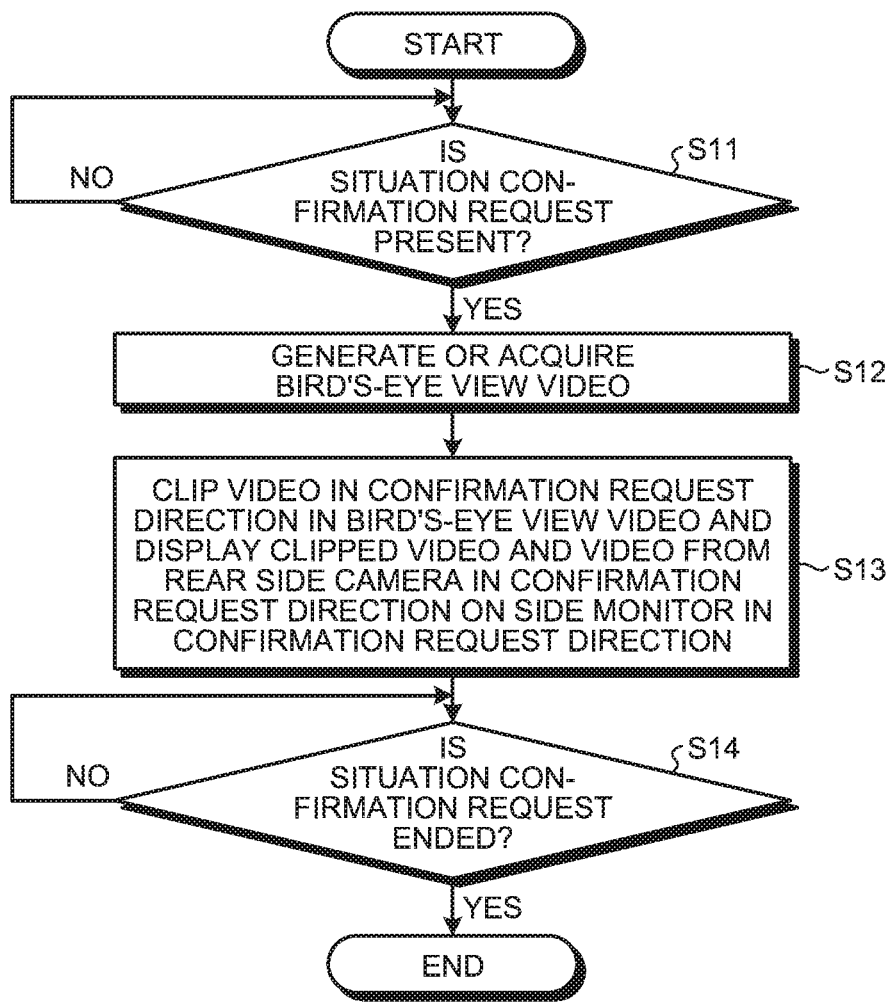
FIG. 6 is a flowchart illustrating flow of processes performed by an on-vehicle display controller of the on-vehicle display system according to the first embodiment.

Next, flow of processes performed by the controller 50 will be described with reference to FIG. 6. FIG. 6 is a flowchart illustrating flow of processes performed by the on-vehicle display controller of the on-vehicle display system according to the first embodiment. As a premise for the processes illustrated in FIG. 6, the rear side video 100 captured by the rear right-side camera 12 is displayed in an entire region of the right-side monitor 33, and the rear side video 100 captured by the rear left-side camera 13 is displayed in an entire region of the left-side monitor 34. It does not matter whether or not a bird's-eye view video is displayed on the infotainment monitor 31 at this time.

The controller 50 determines presence or absence of the situation confirmation request (Step S11). More specifically, the controller 50 determines whether the confirmation request detecting unit 52 has detected the situation confirmation request. If the controller 50 determines that the situation confirmation request has not been detected (NO at Step S11), the controller 50 performs the process at Step S11 again. If the controller 50 determines that the situation confirmation request has been detected (YES at Step S11), the controller 50 proceeds to Step S12.

The controller 50 generates or acquires a bird's-eye view video (Step S12). In the present embodiment, the controller 50 acquires bird's-eye view video data generated by the bird's-eye view video generating unit 53. The process at Step S12 is performed such that when the result at Step S11 is yes and if the bird's-eye view video generating unit 53 is generating a bird's-eye view video, the generated bird's-eye view video is acquired, and if the bird's-eye view video generating unit 53 is not generating a bird's-eye view video, generation of a bird's-eye view video is started and then the generated bird's-eye view video is acquired. The controller 50 proceeds to Step S13.

The controller 50 displays, on the side monitor arranged in the confirmation request direction, a video in the bird's-eye view video corresponding to the confirmation request direction and a video obtained by the rear side camera arranged in the confirmation request direction (Step S13). The controller 50 may clip and display, frame by frame, a video in the confirmation request direction in the bird's-eye view video data generated by the bird's-eye view video generating unit 53, or may use and display only video data in the confirmation request direction in the bird's-eye view video data. In the present embodiment, the controller 50 causes the display controller 59 to display, on the right-side monitor 33, the rear side video 100 of the rear right-side view captured by the rear right-side camera 12 and the bird's-eye view video 110 obtained by clipping the right side in the bird's-eye view video generated by the bird's-eye view video generating unit 53. The controller 50 proceeds to Step S14.

The controller 50 determines whether the situation confirmation request is ended (Step S14). More specifically, if the situation confirmation request is being continuously detected, the controller 50 determines that the situation confirmation request is not ended (NO at Step S14), and performs the process at Step S14 again. If the situation confirmation request is not detected, the controller 50 determines that the situation confirmation request is ended (YES at Step S14), and ends the process.

In this manner, when the situation confirmation request is detected, the on-vehicle display system 1 displays, on the side monitor arranged in the detected confirmation request direction, the rear side video 100 that is captured by the rear side camera arranged in the confirmation request direction and the bird's-eye view video 110 in the confirmation request direction in the bird's-eye view video generated by the bird's-eye view video generating unit 53.

As described above, in the present embodiment, when the situation confirmation request is detected, the rear side video 100, which is captured by the rear side camera arranged in the confirmation request direction, and the bird's-eye view video 110, which is obtained by clipping a region in the confirmation request direction in the bird's-eye view video generated by the bird's-eye view video generating unit 53, are displayed on the side monitor that is arranged in the detected confirmation request direction. In the present embodiment, it is possible to check, on the side monitor arranged in the confirmation request direction, the rear side video 100 and the bird's-eye view video 110 that is obtained by clipping a region in the confirmation request direction. In other words, during the period from the detection of the situation confirmation request to the end of the request, the rear side video 100 and the bird's-eye view video in the confirmation request direction are simultaneously displayed as moving images on the side monitor that is arranged in the confirmation request direction. With this configuration, in the present embodiment, it is possible to more reliably confirm the safety around the vehicle. In this manner, in the present embodiment, it is possible to check the surroundings of the vehicle V appropriately.

For example, when a bird's-eye view video is displayed on the infotainment monitor 31, it is necessary to largely move the line of sight to check the bird's-eye view video 110 in the infotainment monitor 31 and simultaneously check the rear side video 100 in the side monitor.

In contrast, in the present embodiment, it is possible to check both of the rear side video 100 corresponding to the confirmation request direction and the bird's-eye view video 110 corresponding to the confirmation request direction by the side monitor arranged in the confirmation request direction. With this configuration, in the present embodiment, it is possible to reduce movement of the line of sight of the driver.

Second Embodiment

Figure 7:
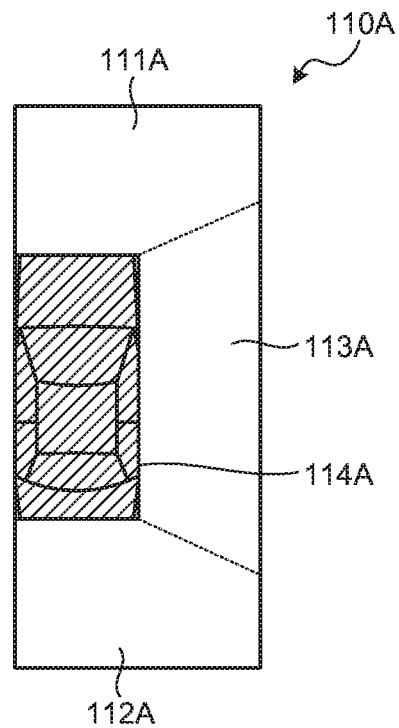
FIG. 7 is a diagram illustrating an example of a bird's-eye view video generated by an on-vehicle display system according to a second embodiment.
Figure 8:
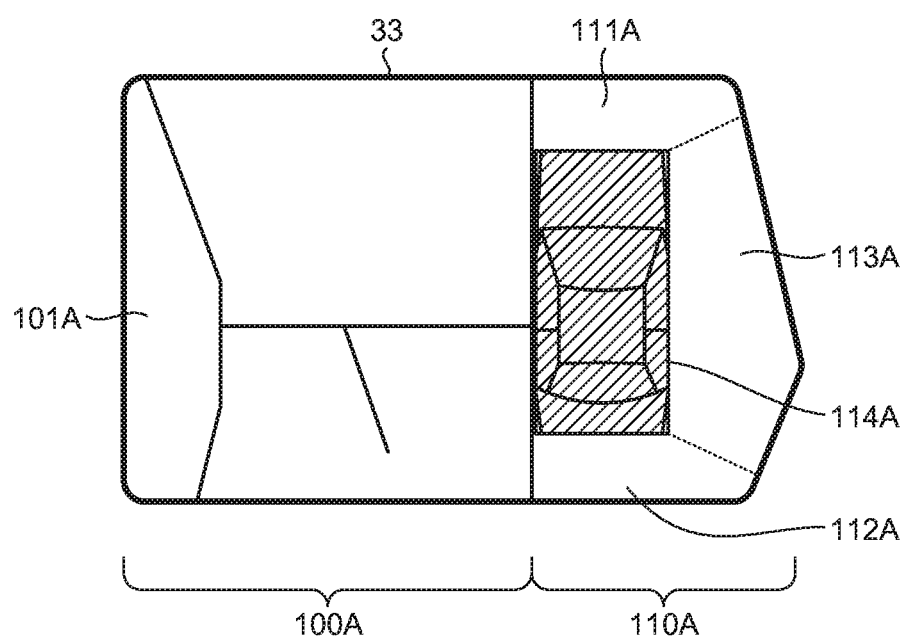
FIG. 8 is a diagram illustrating an example of videos that are displayed on a right-side monitor by the on-vehicle display system according to the second embodiment.
Figure 9:
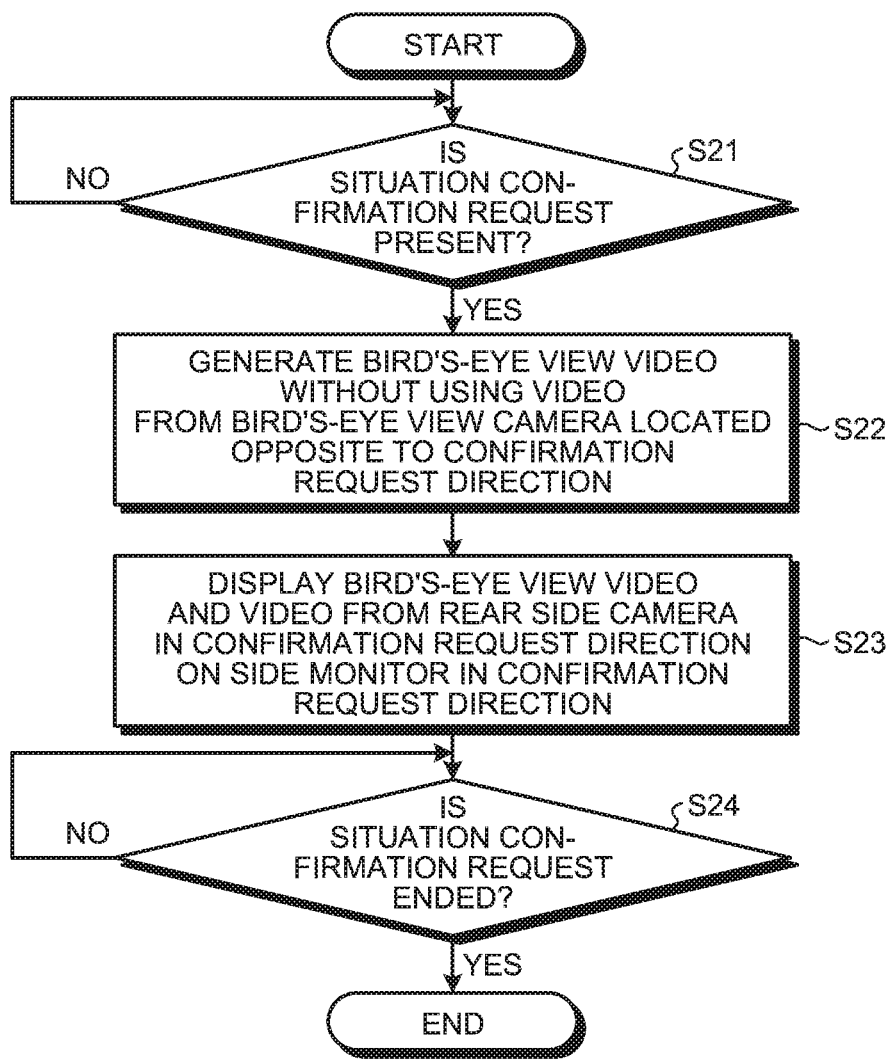
FIG. 9 is a flowchart illustrating flow of processes performed by an on-vehicle display controller of the on-vehicle display system according to the second embodiment.

An on-vehicle display system 1 according to a second embodiment will be described with reference to FIG. 7 to FIG. 9. FIG. 7 is a diagram illustrating an example of a bird's-eye view video generated by the on-vehicle display system according to the second embodiment. FIG. 8 is a diagram illustrating an example of a video that is displayed on a right-side monitor by the on-vehicle display system according to the second embodiment. FIG. 9 is a flowchart illustrating flow of processes performed by an on-vehicle display controller of the on-vehicle display system according to the second embodiment. A basic configuration of the on-vehicle display system 1 is the same as the on-vehicle display system 1 of the first embodiment. In the following description, the same components as those of the on-vehicle display system 1 are denoted by the same reference signs or corresponding signs, and detailed explanation thereof will be omitted. The on-vehicle display system 1 of the present embodiment is different from the on-vehicle display system 1 of the first embodiment in that the controller 50 of the on-vehicle display controller 40 performs different processes.

When the confirmation request detecting unit 52 detects a confirmation request, the bird's-eye view video generating unit 53 generates a bird's-eye view video using videos that are obtained from the front bird's-eye view camera 21 and the rear bird's-eye view camera 22 of the bird's-eye view video camera unit 20 and a video that is obtained from the bird's-eye view camera arranged in the direction corresponding to the confirmation request direction. In the present embodiment, when the confirmation request detecting unit 52 detects a confirmation request, the bird's-eye view video generating unit 53 generates a bird's-eye view video by performing a viewpoint conversion process, a clipping process, and a synthesizing process on the videos that are obtained from the front bird's-eye view camera 21 and the rear bird's-eye view camera 22 and a video that is obtained from the bird's-eye view camera arranged in the confirmation request direction, among surroundings videos that are acquired by the video data acquiring unit 51.

For example, when the confirmation request detecting unit 52 detects a right confirmation request, the bird's-eye view video generating unit 53 generates a bird's-eye view video 110A by performing the viewpoint conversion process, the clipping process, and the synthesizing process on surroundings videos that are acquired by the video data acquiring unit 51 from the right side bird's-eye view camera 23, the front bird's-eye view camera 21, and the rear bird's-eye view camera 22.

For example, when the confirmation request detecting unit 52 detects a left confirmation request, the bird's-eye view video generating unit 53 generates the bird's-eye view video 110A by performing the viewpoint conversion process, the clipping process, and the synthesizing process on surroundings videos that are acquired by the video data acquiring unit 51 from the left side bird's-eye view camera 24, the front bird's-eye view camera 21, and the rear bird's-eye view camera 22.

For example, when the confirmation request detecting unit 52 detects a confirmation request in which the confirmation request direction corresponds to the right side and the left side, the bird's-eye view video generating unit 53 performs the same processes as the processes that are performed when the right confirmation request is detected and the same processes as the processes that are performed when the left confirmation request is detected as described above.

When the confirmation request detecting unit 52 detects a confirmation request, the viewpoint conversion processing unit 531 generates a video by performing the viewpoint conversion process based on a video that is obtained from the bird's-eye view camera that is arranged in the direction corresponding to the confirmation request direction in the bird's-eye view video camera unit 20. In the present embodiment, when the confirmation request detecting unit 52 detects a confirmation request, the viewpoint conversion processing unit 531 generates a video by performing the viewpoint conversion process based on a video that is obtained from the bird's-eye view camera arranged in the confirmation request direction.

When the confirmation request detecting unit 52 detects a confirmation request, the clipping processing unit 532 performs the clipping process of clipping a video of a predetermined region in a video obtained from the bird's-eye view camera corresponding to the confirmation request direction and converted by the viewpoint conversion process. In the present embodiment, a front video 111A and a rear video 112A are obtained by clipping corresponding regions up to the left edge of a vehicle icon 114A.

When the confirmation request detecting unit 52 detects a confirmation request, the synthesizing processing unit 533 performs the synthesizing process of synthesizing the videos clipped by the clipping process and the video obtained from the bird's-eye view camera arranged in the direction corresponding to the confirmation request direction. The synthesizing processing unit 533 generates the bird's-eye view video 110A, in which the vehicle icon 114A is displayed in the synthesized videos.

When the confirmation request detecting unit 52 detects a confirmation request, the display controller 59 displays, on the side monitor arranged in the detected confirmation request direction, a rear side video 100A that is captured by the rear side camera arranged in the confirmation request direction and the bird's-eye view video 110A that is generated by the video obtained from the bird's-eye view camera that is arranged in the direction corresponding to the confirmation request direction in the bird's-eye view video camera unit 20.

For example, when the confirmation request detecting unit 52 detects a right confirmation request, the display controller 59 displays, on the right-side monitor 33, the rear side video 100A that is obtained by capturing a video of the rear right-side view with the rear right-side camera 12 and the bird's-eye view video 110A that is generated from the surroundings videos that are obtained from the right side bird's-eye view camera 23, the front bird's-eye view camera 21, and the rear bird's-eye view camera 22.

For example, when the confirmation request detecting unit 52 detects a left confirmation request, the display controller 59 displays, on the left-side monitor 34, the rear side video 100A that is obtained by capturing a video of the rear left-side view with the rear left-side camera 13 and the bird's-eye view video 110A that is generated from the surroundings videos that are obtained from the left side bird's-eye view camera 24, the front bird's-eye view camera 21, and the rear bird's-eye view camera 22.

For example, when the confirmation request detecting unit 52 detects a confirmation request in which the confirmation request direction corresponds to the right side and the left side, the display controller 59 performs the same processes as the processes that are performed when the right confirmation request is detected and the same processes as the processes that are performed when the left confirmation request is detected as described above.

The bird's-eye view video 110A that is generated by the bird's-eye view video generating unit 53 when the confirmation request detecting unit 52 detects the right confirmation request will be described with reference to FIG. 7.

The bird's-eye view video 110A is a video that is generated using a video obtained from the bird's-eye view camera that is arranged in the confirmation request direction in the bird's-eye view video camera unit 20. In the present embodiment, the video is generated by performing the viewpoint conversion process, the clipping process, and the synthesizing process on surroundings videos that are acquired by the video data acquiring unit 51 from the right side bird's-eye view camera 23, the front bird's-eye view camera 21, and the rear bird's-eye view camera 22. The bird's-eye view video 110A contains the front video 111A, a rear video 112A, and a right side video 113A. In the present embodiment, the front video 111A and the rear video 112A contains corresponding regions up to the left edge of the vehicle icon 114A. The vehicle icon 114A represents the entire shape and size of the vehicle.

The videos that are displayed on the right-side monitor 33 when the confirmation request detecting unit 52 detects the right confirmation request will be described with reference to FIG. 8. The rear side video 100A of the right side and the bird's-eye view video 110A are displayed side by side in the vehicle width direction on the right-side monitor 33. The rear side video 100A of the right side is the same as the rear side video 100 of the right side of the first embodiment. The bird's-eye view video 110A is the same video as illustrated in FIG. 7.

Next, flow of processes performed by the controller 50 will be described with reference to FIG. 9. The processes at Step S21 and Step S24 are the same as the processes at Step S11 and Step S14.

The controller 50 generates a bird's-eye view video without using a video that is obtained from the bird's-eye view camera located opposite to the confirmation request direction (Step S22). More specifically, the controller 50 causes the bird's-eye view video generating unit 53 to generate the bird's-eye view video 110A by performing the viewpoint conversion process, the clipping process, and the synthesizing process on videos other than the video that is obtained from the bird's-eye view camera located opposite to the confirmation request direction among the surroundings videos that are acquired by the video data acquiring unit 51. The controller 50 proceeds to Step S23.

The controller 50 displays, on the side monitor arranged in the confirmation request direction, the bird's-eye view video 110A generated at Step S22 and the rear side video 100A corresponding to the confirmation request direction (Step S23). In the present embodiment, the controller 50 causes the display controller 59 to display, on the right-side monitor 33, the rear side video 100A of the rear right-side view captured by the rear right-side camera 12 and the bird's-eye view video 110A generated at Step S22. The controller 50 proceeds to Step S24.

As described above, in the present embodiment, when a confirmation request is detected, the rear side video 100A, which is captured by the rear side camera arranged in the confirmation request direction, and the bird's-eye view video 110A, which is generated with using the video obtained from the bird's-eye view camera arranged in the confirmation request direction and without using the video obtained from the bird's-eye view camera arranged opposite to the confirmation request direction, are displayed on the side monitor that is arranged in the detected confirmation request direction. In the present embodiment, it is possible to check, on the side monitor arranged in the confirmation request direction, the rear side video 100A and the bird's-eye view video 110A that is generated with using the video obtained from the bird's-eye view camera arranged in the confirmation request direction. With this configuration, in the present embodiment, it is possible to more reliably confirm the safety around the vehicle V. In this manner, in the present embodiment, it is possible to check surroundings of the vehicle V appropriately.

Third Embodiment

Figure 10:
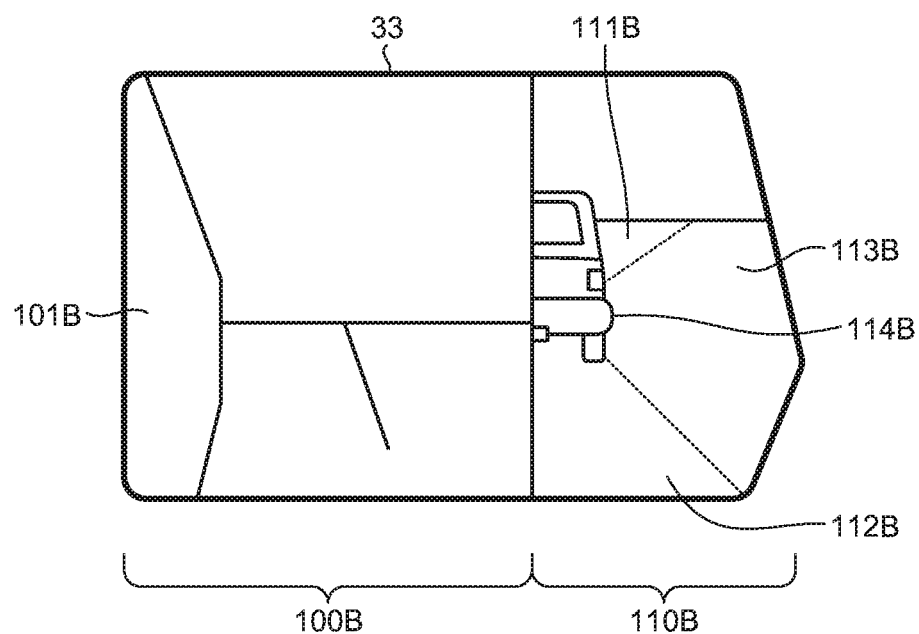
FIG. 10 is a diagram illustrating an example of videos that are displayed on a right-side monitor of an on-vehicle display system according to a third embodiment.
Figure 11:
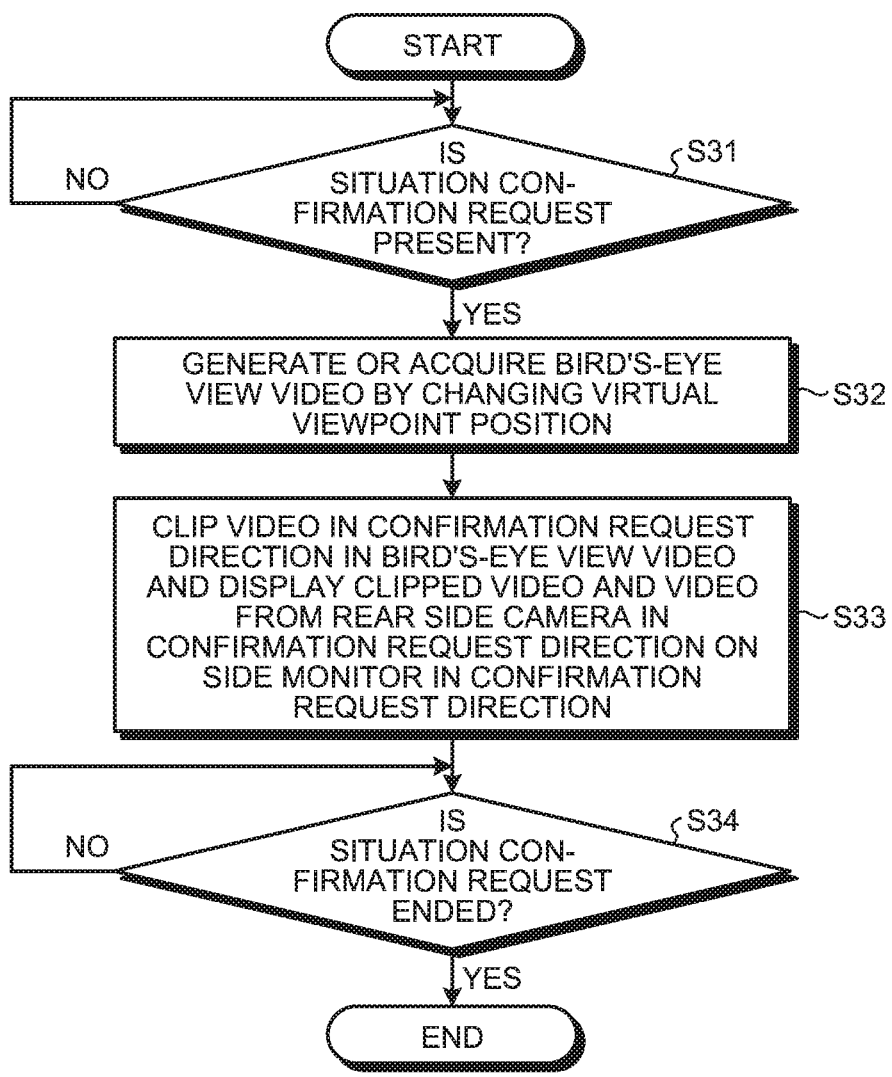
FIG. 11 is a flowchart illustrating flow of processes performed by an on-vehicle display controller of the on-vehicle display system according to the third embodiment.

An on-vehicle display system 1 according to a third embodiment will be described with reference to FIG. 10 and FIG. 11. FIG. 10 is a diagram illustrating an example of a video displayed on a right-side monitor by the on-vehicle display system according to the third embodiment. FIG. 11 is a flowchart illustrating flow of processes performed by an on-vehicle display controller of the on-vehicle display system according to the third embodiment. A basic configuration of the on-vehicle display system 1 is the same as the on-vehicle display system 1 of the first embodiment. The on-vehicle display system 1 of the present embodiment is different from the on-vehicle display system 1 of the first embodiment in that the controller 50 of the on-vehicle display controller performs different processes.

When the confirmation request detecting unit 52 detects a confirmation request, the bird's-eye view video generating unit 53 generates a bird's-eye view video 110B, in which a virtual viewpoint position is changed to a front of the vehicle or a rear of the vehicle. In the present embodiment, when the confirmation request detecting unit 52 detects a confirmation request, the bird's-eye view video generating unit 53 generates the bird's-eye view video 110B, in which the virtual viewpoint position is changed to the rear of the vehicle.

When the confirmation request detecting unit 52 detects a confirmation request, the viewpoint conversion processing unit 531 performs a viewpoint conversion process on surroundings videos obtained from the bird's-eye view cameras arranged in the confirmation request direction in the bird's-eye view video camera unit 20 while changing the virtual viewpoint position to the front of the vehicle or to the rear of the vehicle. In the present embodiment, when the confirmation request detecting unit 52 detects a confirmation request, the viewpoint conversion processing unit 531 performs the viewpoint conversion process on the surroundings videos obtained from the bird's-eye view camera arranged in the confirmation request direction while changing the virtual viewpoint position to the rear of the vehicle.

When the confirmation request detecting unit 52 detects a confirmation request, the display controller 59 displays, on the side monitor arranged in the detected confirmation request direction, a rear side video 100B that is captured by the rear side camera arranged in the confirmation request direction and the bird's-eye view video 110B converted by the viewpoint conversion process while changing the virtual viewpoint position to the front of the vehicle or to the rear of the vehicle. In the present embodiment, when the confirmation request detecting unit 52 detects a confirmation request, the display controller 59 displays, on the side monitor arranged in the detected confirmation request direction, the rear side video 100B that is captured by the rear side camera arranged in the confirmation request direction and the bird's-eye view video 110B converted by the viewpoint conversion process while changing the virtual viewpoint position to the rear of the vehicle.

For example, when the confirmation request detecting unit 52 detects a right confirmation request, the display controller 59 displays, on the right-side monitor 33, the rear side video 100B that is obtained by capturing a video of the rear right-side view with the rear right-side camera 12 and the bird's-eye view video 110B that is obtained by changing the virtual viewpoint position to the front of the vehicle or the rear of the vehicle for the surroundings videos that are obtained from the right side bird's-eye view camera 23, the front bird's-eye view camera 21, and the rear bird's-eye view camera 22.

For example, when the confirmation request detecting unit 52 detects a left confirmation request, the display controller 59 displays, on the left-side monitor 34, the rear side video 100B that is obtained by capturing a video of the rear left-side view with the rear left-side camera 13 and the bird's-eye view video 110B that is obtained by changing the virtual viewpoint positions to the front of the vehicle or the rear of the vehicle for the surroundings videos that are obtained from the left side bird's-eye view camera 24, the front bird's-eye view camera 21, and the rear bird's-eye view camera 22.

The videos that are displayed on the right-side monitor 33 when the confirmation request detecting unit 52 detects the right confirmation request will be described with reference to FIG. 10. The rear side video 100B of the right side and the bird's-eye view video 110B are displayed on the right-side monitor 33.

The rear side video 100B of the rear right-side view is the same as the rear side video 100 of the rear right-side view of the first embodiment.

The bird's-eye view video 110B is a bird's-eye view video that is obtained by changing the virtual viewpoint position to the rear of the vehicle. The bird's-eye view video 110B contains a front video 111B, a rear video 112B, and a right side video 113B such that the vehicle is looked down from the rear. In the present embodiment, the front video 111B and the rear video 112B contain corresponding regions up to the center of a vehicle icon 114B in the vehicle width direction. The vehicle icon 114B represents the shape of the subject vehicle that is looked down from the rear of the vehicle.

Next, flow of processes performed by the controller 50 will be described with reference to FIG. 11. The processes at Step S31 and Step S34 are the same as the processes at Step S11 and Step S14.

The controller 50 generates or acquires a bird's-eye view video by changing the virtual viewpoint position (Step S32). In the present embodiment, the controller 50 causes the bird's-eye view video generating unit 53 to generate the bird's-eye view video 110B by performing, on the videos obtained from the bird's-eye view camera arranged in the confirmation request direction among the surroundings videos acquired by the video data acquiring unit 51, the viewpoint conversion process, the clipping process, and the synthesizing process while changing the virtual viewpoint position to the rear of the vehicle. The controller 50 proceeds to Step S33.

The controller 50 clips a region in the confirmation request direction in the bird's-eye view video 110B generated at Step S32, and displays, on the side monitor arranged in the confirmation request direction, the clipped video and the video obtained from the rear side camera arranged in the confirmation request direction (Step S33). In the present embodiment, the controller 50 causes the display controller 59 to display, on the right-side monitor 33, the rear side video 100B of the rear right-side view that is captured by the rear right-side camera 12 and the bird's-eye view video 110B that is generated while changing the virtual viewpoint position at Step S32. The controller 50 proceeds to Step S34.

As described above, in the present embodiment, when a confirmation request is detected, the rear side video 100B, which is captured by the rear side camera arranged in the confirmation request direction, and the bird's-eye view video 110B, which is obtained by changing the position of the virtual viewpoint to the front of the vehicle or to the rear of the vehicle, are displayed on the side monitor that is arranged in the detected confirmation request direction. In the present embodiment, it is possible to check, on the side monitor arranged in the confirmation request direction, the rear side video and the bird's-eye view video which corresponds to the confirmation request direction and in which the virtual viewpoint position is changed. With this configuration, in the present embodiment, it is possible to more reliably confirm the safety around the vehicle V.

The components of the on-vehicle display system 1 illustrated in the drawings are functionally conceptual and do not necessarily have to be physically configured in the manner illustrated in the drawings. In other words, specific forms of the devices are not limited to those illustrated in the drawings, and all or part of the devices may be functionally or physically distributed or integrated in arbitrary units depending on various loads or use conditions.

The configuration of the on-vehicle display system 1 is realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present application, various omission, replacement, and modifications of the components may be made.

When the confirmation request detecting unit 52 detects a confirmation request, the display controller 59 may display the rear side video 100 that is captured by the rear side camera arranged in the confirmation request direction, and display, in an alternately switching manner and a blinking manner for example, a video corresponding to the confirmation request direction and a video corresponding to a direction opposite to the confirmation request direction in the bird's-eye view video 110 generated by the bird's-eye view video generating unit 53, on the side monitor arranged in the detected confirmation request direction.

In addition, only when the confirmation request detected by the confirmation request detecting unit 52 is issued upon detection of an obstacle, the display controller 59 may display the video corresponding to the confirmation request direction and the video corresponding to the direction opposite to the confirmation request direction in the alternately switching manner. With this configuration, it is possible to check surroundings around the vehicle V more appropriately.

Even when the confirmation request is detected, if the speed of the vehicle V is equal to or faster than a predetermined speed, the display controller 59 may not perform the process of displaying the bird's-eye view video 110 on the side monitor arranged in the detected confirmation request direction. This is because the display region of the rear side video 100 is maintained at the normal size during running at a high speed.

The display controller 59 may shift the clipping region to the front side or the rear side such that the front video 111 or the rear video 112 is displayed in a wider region in the bird's-eye view video 110. With this configuration, it is possible to display information that is more useful for the driver.

The display controller 59, when displaying the bird's-eye view video 110 on the side monitor, may display a line at the border between the rear side video 100 and the bird's-eye view video 110. Alternatively, the display controller 59, when displaying the bird's-eye view video 110 on the side monitor, may display the bird's-eye view video 110 colored in a translucent color with a predetermined translucency. Alternatively, the display controller 59, when displaying the bird's-eye view video 110, may display one of the rear side video 100 and the bird's-eye view video 110 with different luminance or different brightness, or display one of the videos in a blinking manner. With this configuration, in the present embodiment, it is possible to easily recognize that the bird's-eye view video 110 is displayed on the side monitor.

The display controller 59, when starting to display the bird's-eye view video 110 on the side monitor, may display a video such that the bird's-eye view video 110 is slid and framed in from the outside, and when ending the display, may display a video such that the bird's-eye view video 110 is slid and framed out to the outside. With this configuration, in the present embodiment, it is possible to easily recognize that the bird's-eye view video 110 is displayed on the side monitor.

According to the present application, it is possible to check surroundings of a vehicle appropriately.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle display control device comprising:
a video data acquiring unit configured to acquire first video data from of bird's-eye view video cameras that capture videos of a front, a rear, a left side, and a right side of a vehicle, and second video data from rear side cameras that capture rear side videos of a rear left-side view and a rear right-side view of the vehicle;
a bird's-eye view video generating unit configured to generate a bird's-eye view video by performing a viewpoint conversion process and a synthesizing process on the videos captured by the bird's-eye view video cameras acquired by the video data acquiring unit;
a confirmation request detecting unit configured to detect a left-right situation confirmation request for the vehicle; and
a display controller configured to, in response to detection of the confirmation request by the confirmation request detecting, display, on a monitor arranged in a direction of the detected confirmation request and selected from among a first monitor for confirming the rear left-side view of the vehicle and a second monitor for confirming the rear right-side view of the vehicle, one of the rear side videos that is obtained from a rear side camera, of the rear side cameras, arranged in the direction of the confirmation request and a video obtained by clipping a region in a direction corresponding to the direction of the confirmation request in the bird's-eye view video generated by the bird's-eye view video generating unit.

2. The on-vehicle display control device according to claim 1, wherein the display controller is configured to, in response to detection of the confirmation request by the confirmation request detecting unit display, as a video in a direction corresponding to the direction of the confirmation request in the bird's-eye view video generated by the bird's-eye view video generating unit, the bird's-eye view video in the direction of the confirmation request in the bird's-eye view video.

3. The on-vehicle display control device according to claim 1, wherein the bird's-eye view video generating unit is configured to, in response to detection of the confirmation request by the confirmation request detecting unit generate the bird's-eye view video by using a first video obtained from at least one of a front bird's-eye view camera or a rear bird's-eye view camera selected from among the bird's-eye view video cameras, and a second video that is obtained from a camera that is arranged in the direction of the confirmation request selected from among a right-side bird's-eye view camera and a left-side bird's-eye view camera.

4. The on-vehicle display control device according to claim 1, wherein the bird's-eye view video generating unit is configured to, in response to detection of the confirmation request by the confirmation request detecting unit generate the bird's-eye eye view video by changing a virtual viewpoint position to a front of the vehicle or a rear of the vehicle.

5. The on-vehicle display control device according to claim 1, wherein the display controller is configured to, in response to detection of the confirmation request by the confirmation request detecting unit, display the one of the rear side videos that is obtained from the rear side camera arranged in the direction of the confirmation request, and display, in an alternately switching manner on a display arranged in the detected direction of the confirmation request, a video corresponding to the direction of the confirmation request and a video corresponding to an opposite direction of the confirmation request in the bird's-eye view video generated by the bird's-eye view video generating unit.

6. The on-vehicle display control device according to claim 5, wherein the confirmation request is a confirmation request based on an obstacle present around the vehicle.

7. An on-vehicle display system comprising:
the on-vehicle display control device according to claim 1; and
at least one of the bird's-eye view video cameras, the rear side cameras, and the display.

8. An on-vehicle display control method comprising:
acquiring first video data from a plurality of bird's-eye view video cameras that capture videos of a front, a rear, a left side, and a right side of a vehicle, and second video data from rear side cameras that capture rear side videos of a rear left-side view and a rear right-side view of the vehicle;
generating a bird's-eye view video by performing a viewpoint conversion process and a synthesizing process on the videos captured by the plurality of bird's-eye view video cameras;
detecting a left-right situation confirmation request for the vehicle as a confirmation request; and
in response to detection of the confirmation request, displaying, on a monitor arranged in a direction of the confirmation request and selected from among a first monitor for confirming the rear left-side and a second monitor for confirming the rear right-side, one of the rear side videos obtained from a rear side camera, of the rear side cameras, arranged in the direction of the confirmation request and a video obtained by clipping a region in a direction corresponding to the direction of the confirmation request in the bird's-eye view video.

9. A non-transitory storage medium that stores a program that causes a computer that functions as an on-vehicle display control device to execute:
acquiring first video data from bird's-eye view video cameras that capture videos of a front, a rear, a left side, and a right side of a vehicle, and second video data from rear side cameras that capture rear side videos of a rear left-side view and a rear right-side view of the vehicle;
generating a bird's-eye view video by performing a viewpoint conversion process and a synthesizing process on the videos of the bird's-eye view video cameras;
detecting a left-right situation confirmation request for the vehicle as a confirmation request; and
in response to detection of the confirmation request, displaying, on a monitor arranged in a direction of the confirmation request and selected from among a left side monitor for confirming the rear left-side and a right side monitor for confirming the rear right-side, one of the rear side videos that is obtained from a selected rear side camera, of the rear side cameras arranged in the direction of the confirmation request and a video obtained by clipping a region in a direction corresponding to the direction of the confirmation request in the bird's-eye view video.

* * * * *